US012055898B2

(12) United States Patent
Loetscher

(10) Patent No.: US 12,055,898 B2
(45) Date of Patent: Aug. 6, 2024

(54) DEVICE FOR ATTACHING A WRISTLET

(71) Applicant: OMEGA SA, Biel/Bienne (CH)

(72) Inventor: Philippe Loetscher, Evilard (CH)

(73) Assignee: OMEGA SA, Biel/Bienne (CH)

( * ) Notice: Subject to any disclaimer, the term of this patent is extended or adjusted under 35 U.S.C. 154(b) by 618 days.

(21) Appl. No.: 16/973,128

(22) PCT Filed: Jul. 5, 2019

(86) PCT No.: PCT/EP2019/068148
§ 371 (c)(1),
(2) Date: Dec. 8, 2020

(87) PCT Pub. No.: WO2020/043371
PCT Pub. Date: Mar. 5, 2020

(65) Prior Publication Data

US 2021/0255586 A1 Aug. 19, 2021

(30) Foreign Application Priority Data

Aug. 28, 2018 (EP) .................................... 18191117

(51) Int. Cl.
*G04B 37/14* (2006.01)

(52) U.S. Cl.
CPC ................................ *G04B 37/1486* (2013.01)

(58) Field of Classification Search
CPC .............. G04B 37/1486; A44C 5/2057; A44C 5/145; A44B 11/263
See application file for complete search history.

(56) References Cited

U.S. PATENT DOCUMENTS

| | | | | |
|---|---|---|---|---|
| 2016/0037876 | A1* | 2/2016 | Perkins ................ | A44B 11/263 224/164 |
| 2016/0262504 | A1* | 9/2016 | Schooley ........... | G04B 37/1486 |
| 2016/0282899 | A1* | 9/2016 | Inagaki ................ | H04B 5/0062 |

FOREIGN PATENT DOCUMENTS

| | | |
|---|---|---|
| CN | 106163319 A | 11/2016 |
| CN | 207613312 U * | 7/2018 |
| CN | 207613312 U | 7/2018 |

(Continued)

OTHER PUBLICATIONS

Communication dated Jul. 21, 2021, issued by the State Intellectual Property Office of the P.R.C. in application No. 201980051983.2.

(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

The invention relates to a device for attaching a wristlet strand to a watch case, the device being arranged to be attached to a bar, the wristlet strand being attached to the bar through attaching means. According to the invention, the attaching means are formed by a support integral with the wristlet strand, a pull-out piece arranged to cooperate with said support so as to close the support, the support comprising a channel capable of receiving the bar, and in that they comprise a pair of magnets disposed on the support and the pull-out piece so as to hold the pull-out piece against the support and allow the pull-out piece to switch from a closed position wherein the bar is held in the channel to an open position wherein the bar is free.

12 Claims, 2 Drawing Sheets

(56) References Cited

FOREIGN PATENT DOCUMENTS

| | | | |
|---|---|---|---|
| WO | 2016/145898 | A1 | 9/2016 |
| WO | 2016/148800 | A1 | 9/2016 |

OTHER PUBLICATIONS

International search report for PCT/EP2019/068148 dated Sep. 26, 2019.

* cited by examiner

DEVICE FOR ATTACHING A WRISTLET

CROSS-REFERENCE TO RELATED APPLICATIONS

This application is a National Stage of International Application No. PCT/EP2019/068148 filed Jul. 5, 2019, which claims priority under U.S.C. § 119(a) to European Patent Application No. 18191117.3 filed on Aug. 28, 2018.

FIELD OF THE INVENTION

The present invention relates to the field of watchmaking or jewellery. It relates more specifically to a device for attaching a wristlet to an object, in particular a watch case.

BACKGROUND OF THE INVENTION

Generally, the wristlets, made of leather or metal, are attached to the horns of a watch case, by means of a bar formed of a tube, wherein are mounted two pistons movable in translation, and an elastic member disposed between said pistons and tending to drive them out of the tube. Said bar is mounted in a housing provided for this purpose at one end of the wristlet, and the pistons are engaged in blind bores made facing each other in the horns of the case.

The placement and removal of a wristlet using this attachment mode requires the use of tools to retract and hold the piston. Such an operation requires a certain skill. Furthermore, when the bar is introduced between the horns, it is necessary to find the hole made in the horns to allow the spring to introduce this pin therein.

For example, document WO2016148800 discloses a watch wristlet comprising a strand and an attaching mechanism integrated at one end of the strand. The clasp mechanism comprises a concave element defining a channel at the end of the strand, and a closure plate configured to displace between a first position wherein the plate covers the channel, and a second position wherein the plate is retracted to leave at least part of the channel uncovered by the plate.

Such an attaching device comprises too many parts, which can interfere with the proper operation of the device and involves replacing the wristlet when a part breaks.

In addition, such an attachment mode does not allow good integration of the wristlet into the middle part, openwork or defects that may be visible at the case/wristlet junction.

SUMMARY OF THE INVENTION

The present invention allows to overcome these disadvantages, by providing a device for attaching a wristlet strand to a watch case, the device being arranged to be attached to a bar, the wristlet strand being attached to the bar through attaching means.

According to the invention, the attaching means are formed by a support integral with the wristlet strand, a pull-out piece arranged to cooperate with said support so as to close the support, the support comprising a channel capable of receiving the bar, and in that they comprise a pair of magnets disposed on the support and the pull-out piece so as to hold the pull-out piece against the support and allow the pull-out piece to switch from a closed position wherein the bar is held in the channel to an open position wherein the bar is free.

In accordance with other advantageous variants of the invention:

- the width of the support is less than the width of the wristlet strand;
- the support comprises guide rails for the pull-out piece;
- the pull-out piece comprises a manipulation button;
- the strand comprises a hollow arranged to receive the manipulation button, said hollow also acting as a stop when the pull-out piece is in the open position;
- the support and the pull-out piece are made of stainless steel;
- the wristlet strand is made of a flexible material such as rubber or textile.

Such an attaching device is in particular intended to equip watches having non-magnetic properties.

BRIEF DESCRIPTION OF THE DRAWINGS

Other features and advantages of the present invention will emerge more clearly from the detailed description which follows of an embodiment of a device for attaching a wristlet according to the invention, this example being given purely by way of illustration and only in a non-limiting manner, in connection with the appended drawing wherein.

DETAILED DESCRIPTION OF PREFERRED EMBODIMENTS

Figure 1A:
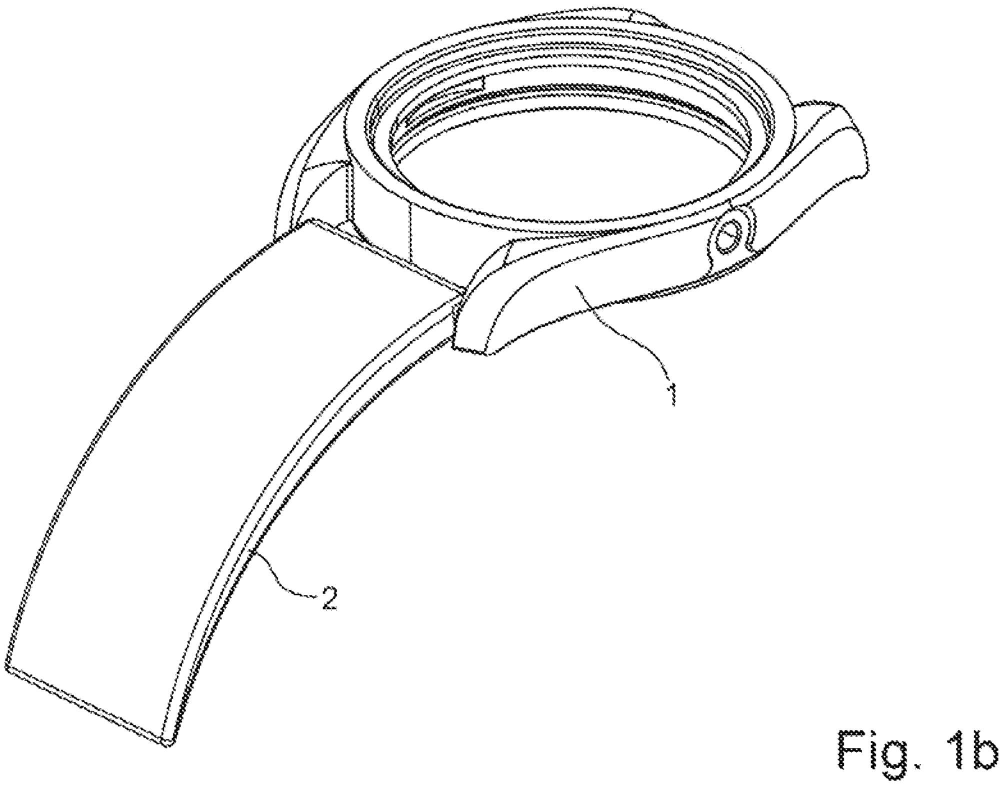
FIGS. 1*a* and 1*b* respectively illustrate perspective top and bottom views of a watch case equipped with an attaching device according to the invention.
Figure 1B:
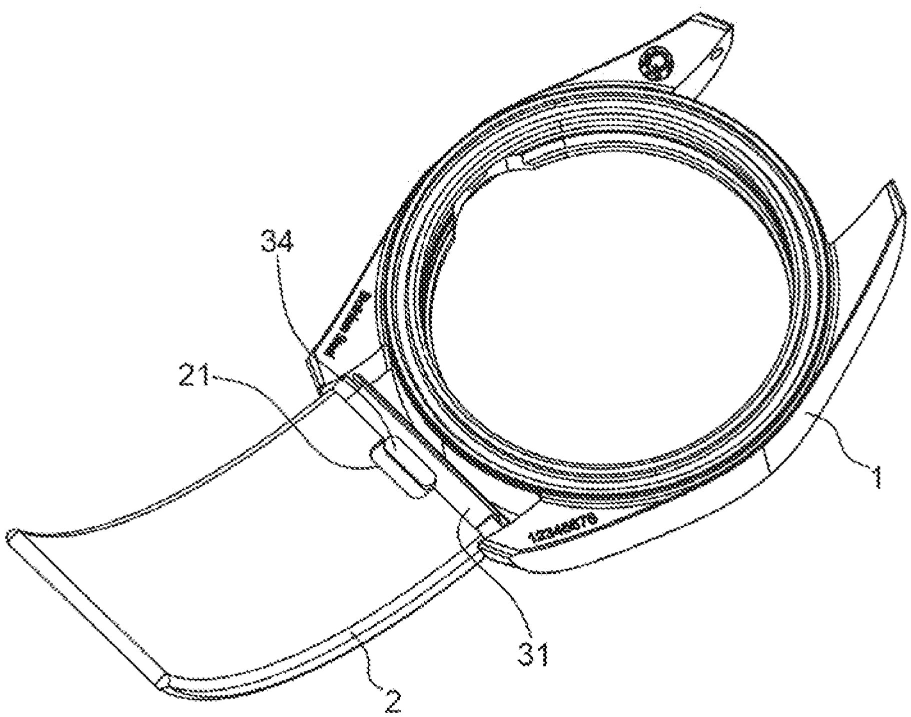
Figure 2:
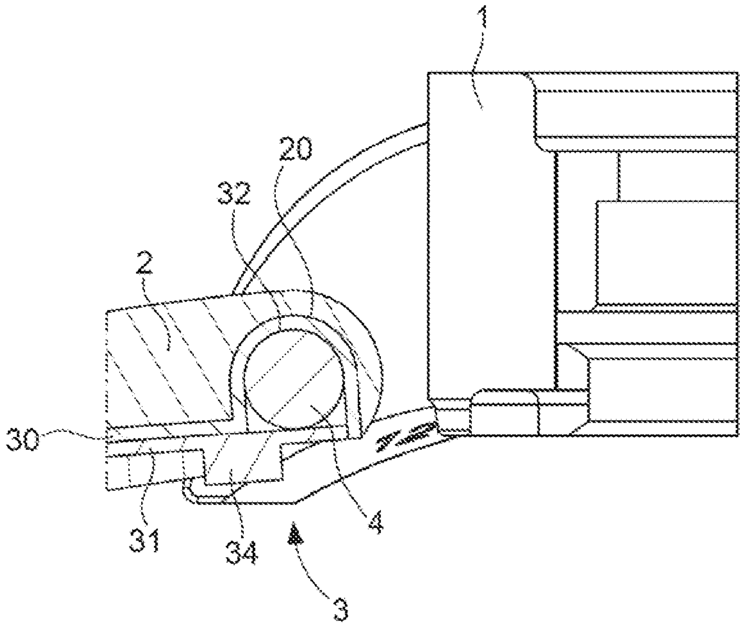
FIG. 2 shows a sectional view of a watch case equipped with an attaching device according to the invention.
Figure 3:
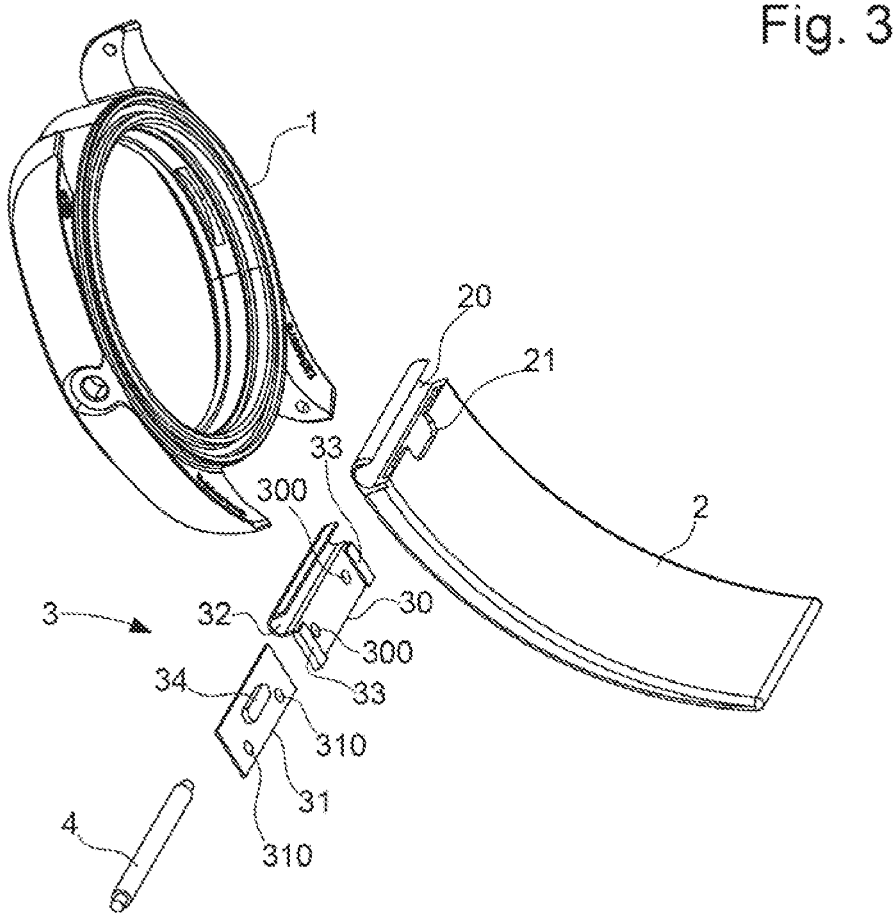
FIG. 3 shows an exploded view of an attaching device according to the invention equipping a watch case.

FIGS. 1 to 3 illustrate a wristwatch as well as detailed views of the device for attaching the wristlet to the watch case 1 according to a preferred embodiment of the invention. The device for attaching the wristlet to the watch case 1 comprises the wristlet strand 2 and attaching means 3. The wristlet strand 2 can be made of textile, rubber, leather, or else plastic material.

According to the invention, the attaching means are formed by a support 30 integral with the wristlet strand 2, a pull-out piece 31 arranged to cooperate with the support 30 so as to close the support 30, the support 30 comprising a channel 32 capable of receiving the bar 4, and in that they comprise a pair of magnets 300, 310 disposed on the support 30 and the pull-out piece 31 so as to hold the pull-out piece 31 against the support 30 and allow the pull-out piece 31 to switch from a closed position wherein the bar 4 is held in the channel 32 to an open position wherein the bar 4 is free.

The end of the wristlet strand 2 covers the attaching means 3 so that the latter are visible only from below and are therefore invisible when the watch is worn. In a particular embodiment, the wristlet strand 2 is overmoulded on the attaching means 3. Obviously, the person skilled in the art can also consider gluing the strand on the attaching means.

Likewise, the wristlet has at its end a portion 20 of a shape complementary to the shape of the channel 32 to hide the latter. The person skilled in the art might also consider leaving the channel 32 visible.

The attaching means 3 comprise a support 30, which is preferably made of stainless steel, the support 30 including a channel 32 arranged to receive the bar 4, and to hold the wristlet strand on the latter.

Advantageously, the width of the support 30 is slightly less than the width of the wristlet strand 2, the support 30 therefore being invisible when the watch is worn.

A pull-out piece 31 is provided to close the support 30, this closing pull-out piece is also made of stainless steel.

The pull-out piece 31 is mounted against the support 30 by means of guide rails 33 disposed on each side edge of the support 30, so that the pull-out piece 31 is flush with the support 30 and that it can displace on the latter, the guide rails 33 starting at the end covered by the wristlet strand 2 and ending at the groove formed by the channel 32.

Advantageously, the support 30 and the pull-out piece 31 each comprise a pair of magnets 300, 310 to define a closed position when the pull-out piece covers the channel 32 and an open position when the pull-out piece 31 is retracted and releases the channel 32.

Hollows are respectively formed in the pull-out piece 31 and in the support 30 so as to receive the magnets. The magnets 310 of the pull-out piece 31 and the magnets 300 of the support 30 are respectively of opposite poles and are positioned face to face when the pull-out piece 31 is in the closed position. The magnets 300, 310 thus form a lock and also allow the pull-out piece 31 to slide from the closed position to the open position when the wearer manipulates the pull-out piece 31, then to return to the closed position when the wearer releases the pull-out piece.

So as to have a normal operation of the device, the pull-out piece 31 and the support 30 are made of a material insensitive to magnetism to avoid any interactions with the magnets.

In order to release the wristlet strand 2 from the bar 4, the user manipulates the pull-out piece 31 by means of a manipulation button 34 and displaces the pull-out piece 31 to the open position.

The magnets thus advantageously replace the springs conventionally used in the devices of the prior art, which allows to reduce the number of components used and to eliminate the risk of a component breaking.

The manipulation button 34 is designed to be actuated by the wearer and to open the device. The manipulation button 34 is in contact with the wearer's skin when the watch is worn. Advantageously, the button 34 is made of a material identical to that of the pull-out piece 31, such as stainless steel for example, and forms an integral element with said pull-out piece. The manipulation button 34 has polished edges to improve comfort when the watch is worn.

The strand 2 comprises, on its face which is in contact with the wearer, a hollow 21 of a shape complementary to that of the button and which is arranged to receive the manipulation button when the pull-out piece is in the open position, said hollow acting as a stop when the pull-out piece is in the open position and thus defining the possible travel of the pull-out piece for switching into the open position.

To mount the strand 2 on the watch 1, the wearer manipulates the pull-out piece 31 via the button 34 and pulls or pushes on the latter to slide the pull-out piece 31 and make the channel 32 accessible. The wearer then positions the bar 4 in the channel 32 and releases the button 34 so that the pull-out piece 31 returns to its closed position thanks to the magnets 300, 310.

Of course, the present invention is not limited to the example illustrated and is susceptible to various variations and modifications which will be apparent to a person skilled in the art.

The invention claimed is:

1. A attaching device for attaching a wristlet strand to a watch case, the device being arranged to be attached to a bar, the wristlet strand being attached to the bar through attaching means, wherein the attaching means are formed by a support integral with the wristlet strand, a pull-out piece arranged to cooperate with said support so as to close the support, the support comprising a channel arranged to receive the bar, and wherein the attaching means comprise a first magnet, disposed on the support, and a second magnet, disposed on a face of the pull-out piece, so as to hold the pull-out piece against the support and allow the pull-out piece to switch from a closed position wherein the bar is held in the channel to an open position wherein the bar is free, wherein a perimeter of the face of the pull-out piece is a rectangle.

2. The attaching device according to claim 1, wherein the width of the support is less than the width of the wristlet strand.

3. The attaching device according to claim 1, wherein the support comprises guide rails for the pull-out piece.

4. The attaching device according to claim 1, wherein the pull-out piece comprises a manipulation button.

5. The attaching device according to claim 4, wherein the strand comprises a hollow arranged to receive the manipulation button, said hollow also acting as a stop when the pull-out piece is in the open position.

6. The attaching device according to claim 5, wherein the support and the pull-out piece are made of stainless steel.

7. The attaching device according to claim 6, wherein the wristlet strand is made of a flexible plastic material such as rubber or textile.

8. A watch comprising the attaching device according to claim 7.

9. The attaching device according to claim 1, wherein the wristlet strand comprises:

a portion having a complementary shape to the channel of the support and into which the channel is arranged; and a hollow into which the support is slidingly arranged therein, wherein the support comprises a pair of guide rails, wherein the pull-out piece is attached to the support by a combination of being held by the pair of guide rails and a magnetic coupling between the first magnet and the second magnet while the pull-out piece holds the bar in the channel, and wherein the first magnet is arranged between the pair of guide rails.

10. The attaching device according to claim 9, wherein an outer curvature of the channel of the support fits into an inner curvature of the portion having the complementary shape to the channel of the support, wherein the outer curvature of the channel of the support is facing away from a side of the support having the pair of guide rails thereon.

11. The attaching device according to claim 1, wherein the pull-out piece is attached to the support by a combination of being held by the pair of guide rails and a magnetic coupling between the first magnet and the second magnet while the pull-out piece holds the bar in the channel and while the first magnet and the second magnet are both arranged between the pair of guide rails.

12. The attaching device according to claim 1, wherein the first magnet and the second magnet are both separate from the watch case.

* * * * *